US012244092B2

(12) United States Patent
Yonezu

(10) Patent No.: US 12,244,092 B2
(45) Date of Patent: Mar. 4, 2025

(54) CONNECTOR WITH DUMMY PLUG

(71) Applicant: SUMITOMO WIRING SYSTEMS, LTD., Mie (JP)

(72) Inventor: Takuma Yonezu, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 395 days.

(21) Appl. No.: 17/889,651

(22) Filed: Aug. 17, 2022

(65) Prior Publication Data

US 2023/0054933 A1 Feb. 23, 2023

(30) Foreign Application Priority Data

Aug. 20, 2021 (JP) ................................ 2021-134470

(51) Int. Cl.
*H01R 13/443* (2006.01)
*H01R 13/504* (2006.01)
*H01R 13/516* (2006.01)
*H01R 13/52* (2006.01)

(52) U.S. Cl.
CPC ..... *H01R 13/5205* (2013.01); *H01R 13/5045* (2013.01); *H01R 13/516* (2013.01)

(58) Field of Classification Search
CPC ................................................ H01R 13/5205
USPC ........................................................ 439/587
See application file for complete search history.

(56) References Cited

U.S. PATENT DOCUMENTS 5,551,892 A * 9/1996 Endo ...................... H01R 43/22 439/589
5,707,251 A * 1/1998 Sakai .................. H01R 13/443 439/589
6,171,144 B1 * 1/2001 Stone .................. H01R 13/508 439/587
7,559,797 B2 * 7/2009 Shishikura ......... H01R 13/5208 439/587
D880,423 S * 4/2020 Obata .......................... D13/133
10,693,254 B2 * 6/2020 Obata .................. H01R 13/443
2019/0356076 A1 11/2019 Obata et al.
2023/0114179 A1 * 4/2023 Kataoka ............. H01R 13/5202 439/519

FOREIGN PATENT DOCUMENTS

JP 2012-190632 A 10/2012
JP 2012-216342 A 11/2012

* cited by examiner

*Primary Examiner* — Neil Abrams
(74) *Attorney, Agent, or Firm* — Venjuris, P.C.

(57) ABSTRACT

A connector C is provided with a housing 30 formed with a through hole 39, a rubber plug 60 to be arranged inside the housing 30 and formed with a sealing hole 61, and a dummy plug 10 to be arranged from the through hole 39 to the sealing hole 61. The housing 30 includes recesses 43 open in an inner surface of the through hole 39. The dummy plug 10 includes a plug body 11 to be arranged in the sealing hole 61, an extending portion 12 continuously extending from the plug body 11 and to be arranged in the through hole 39, and protrusions 16 projecting from an outer peripheral surface of the extending portion 12 and arranged to be press-fit into the recesses 43.

5 Claims, 7 Drawing Sheets

CONNECTOR WITH DUMMY PLUG

CROSS-REFERENCE TO RELATED APPLICATIONS

This application is based on and claims priority from Japanese Patent Application No. 2021-134470, filed on Aug. 20, 2021, with the Japan Patent Office, the disclosure of which is incorporated herein in its entirety by reference.

TECHNICAL FIELD

The present disclosure relates to a connector.

BACKGROUND

A waterproof connector is disclosed in Japanese Patent Laid-open Publication No. 2019-204602. The waterproof connector includes a housing. The housing includes a housing body and a rear cover to be arranged behind the housing body. The rear cover is formed with two terminal insertion openings. A recess is formed inside the housing body. A rubber plug (called a waterproof member in Japanese Patent Laid-open Publication No. 2019-204602) is arranged in the recess. The rubber plug is formed with two sealing holes, which communicate with the respective terminal insertion openings. A terminal is inserted into one terminal insertion opening, out of the two terminal insertion openings of the housing body, and a dummy plug (called a dummy pin in Japanese Patent Laid-open Publication No. 2019-204602) is inserted into the other terminal insertion opening to prevent water intrusion into the waterproof connector. The dummy plug is in the form of a pin extending from the sealing hole to the terminal insertion opening and includes a waterproof portion to be held in close contact with the inner surface of the sealing hole. Note that connectors, to which a dummy plug is applied, are also disclosed in Japanese Patent Laid-open Publication Nos. 2012-216342 and 2012-190632.

SUMMARY

If the dummy plug is inserted into the terminal insertion opening while being shifted in position, the waterproof portion may not be properly inserted into the sealing hole and sealability may be reduced due to the damage of the rubber plug or the like.

Accordingly, the present disclosure aims to provide a connector capable of preventing a reduction in sealability.

The present disclosure is directed to a connector with a housing formed with a through hole, a rubber plug to be arranged inside the housing, the rubber plug being formed with a sealing hole communicating with the through hole, and a dummy plug to be arranged from the through hole to the sealing hole, wherein the housing includes a recess open in an inner surface of the through hole, and the dummy plug includes a plug body to be held in close contact with an inner surface of the sealing hole by being arranged in the sealing hole, an extending portion continuously extending from the plug body, the extending portion being arranged in the through hole, and a protrusion projecting from an outer peripheral surface of the extending portion, the protrusion being arranged to be press-fit into the recess.

According to the present disclosure, it is possible to provide a connector capable of preventing a reduction in sealability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
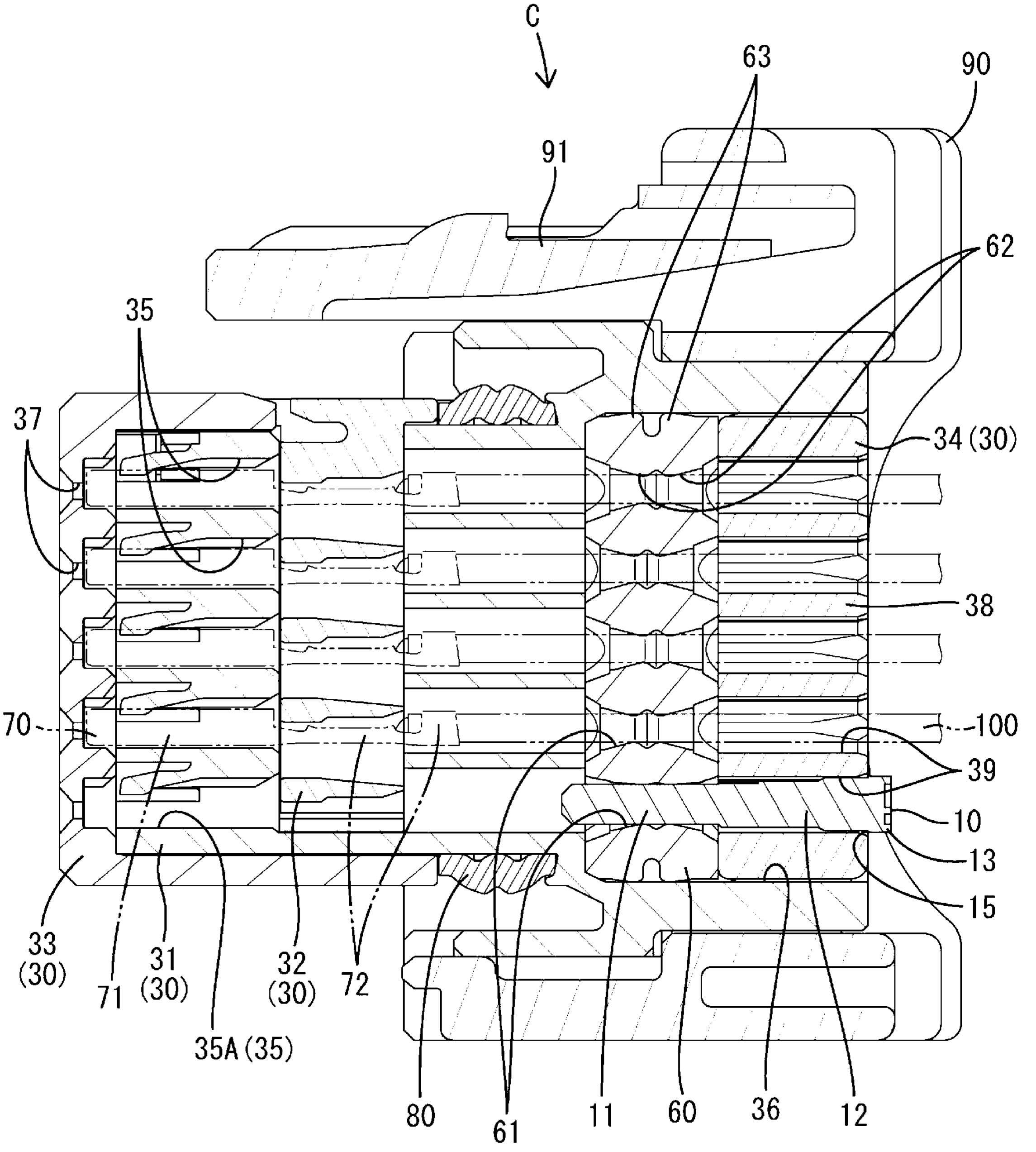
FIG. 1 is a side view in section of a connector according to one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a housing formed with a through hole, a rubber plug to be arranged inside the housing, the rubber plug being formed with a sealing hole communicating with the through hole, and a dummy plug to be arranged from the through hole to the sealing hole, wherein the housing includes a recess open in an inner surface of the through hole, and the dummy plug includes a plug body to be held in close contact with an inner surface of the sealing hole by being arranged in the sealing hole, an extending portion continuously extending from the plug body, the extending portion being arranged in the through hole, and a protrusion projecting from an outer peripheral surface of the extending portion, the protrusion being arranged to be press-fit into the recess.

Since the protrusion is press-fit and positioned in the recess, a state where the plug body is properly inserted in the sealing hole can be realized and a reduction in sealability can be prevented.

(2) Preferably, a plurality of the protrusions are arranged at intervals in a circumferential direction on the outer peripheral surface of the extending portion.

Since any one of the plurality of protrusions is press-fit and positioned in the recess, the state where the plug body is properly inserted in the sealing hole can be quickly realized.

(3) A pair of the recesses may be arranged in the inner surface of the through hole, and the protrusion may be arranged to be press-fit into each of the pair of recesses.

Since the protrusion is arranged to be press-fit into each of the pair of recesses, the dummy plug can be stably arranged in the housing.

(4) The recess may be in the form of a groove extending from an inlet for introducing the protrusion toward a side communicating with the sealing hole in the inner surface of the through hole and have a pair of inclined surfaces expanded toward the inlet on a pair of facing side surfaces.

Even if the position of the dummy plug is shifted from a proper position, the protrusion moves along the inclined surfacs of the recess in a mounting process of the dummy plug, whereby the dummy plug can be automatically brought to the proper position. Thus, a worker can perform a mounting operation without considering an orientation about an axis of the dummy plug (directionality) and workability is excellent.

(5) The inner surface of the through hole may include a pair of short side portions facing each other and a pair of long side portions facing each other while intersecting the pair of short side portions and longer than the short side portions in the housing, the recess may be open in the long side portion, and the pair of inclined surfaces may be inclined to approach the short side portions toward the inlet on the long side portion.

Even if the position of the dummy plug is shifted in a length direction of the long side portions, the protrusion moves along the inclined surfaces of the recess in the mounting process of the dummy plug, whereby the dummy plug can be automatically brought to the proper position. Particularly, since the position of the dummy plug is easily shifted in the length direction of the long side portions, an advantage of being able to correct the position shift of the dummy plug by applying the above configuration is great.

Details of Embodiment of Present Disclosure

A specific example of an embodiment of the present disclosure is described below with reference to the drawings. Note that the present invention is not limited to these illustrations and is intended to be represented by claims and include all changes in the scope of claims and in the meaning and scope of equivalents.

A connector C according to this embodiment is provided with a housing 30, a rubber plug 60, a dummy plug 10, terminal fittings 70, a sealing ring 80 and a lever 90 as shown in FIG. 1. The connector C is connectable to an unillustrated mating connector. Note that, in the following description, a side of the connector C to be connected to the mating connector is referred to as a front side concerning a front-rear direction. A left side of FIG. 1 is a front side. A vertical direction is based on a vertical direction of each figure.

Housing

The housing 30 is made of synthetic resin and includes, as shown in FIG. 1, a housing body 31, a retainer 32, a front holder 33 and a rear holder 34. Any of the retainer 32, the front holder 33 and the rear holder 34 is assembled with the housing body 31.

The housing body 31 is formed with a plurality of cavities 35 extending in the front-rear direction. An accommodating portion 36 is formed by recessing the rear surface of the housing body 31. Each cavity 35 communicates with the accommodating portion 36. The terminal fitting 70 is inserted and accommodated into each cavity 35.

The retainer 32 is assembled in an intermediate part in the front-rear direction of the housing body 31. The retainer 32 locks the terminal fittings 70 inserted into the respective cavities 35 and restricts the terminal fittings 70 from coming out from the cavities 35.

The front holder 33 is cap-shaped and mounted on the housing body 31 to cover the front surface of the housing body 31. A front wall part of the front holder 33 is formed with a plurality of tab insertion holes 37 communicating with the respective cavities 35. A tab of an unillustrated mating terminal fitting connectable to the terminal fitting 70 is inserted into each tab insertion hole 37 from front.

Figure 2:
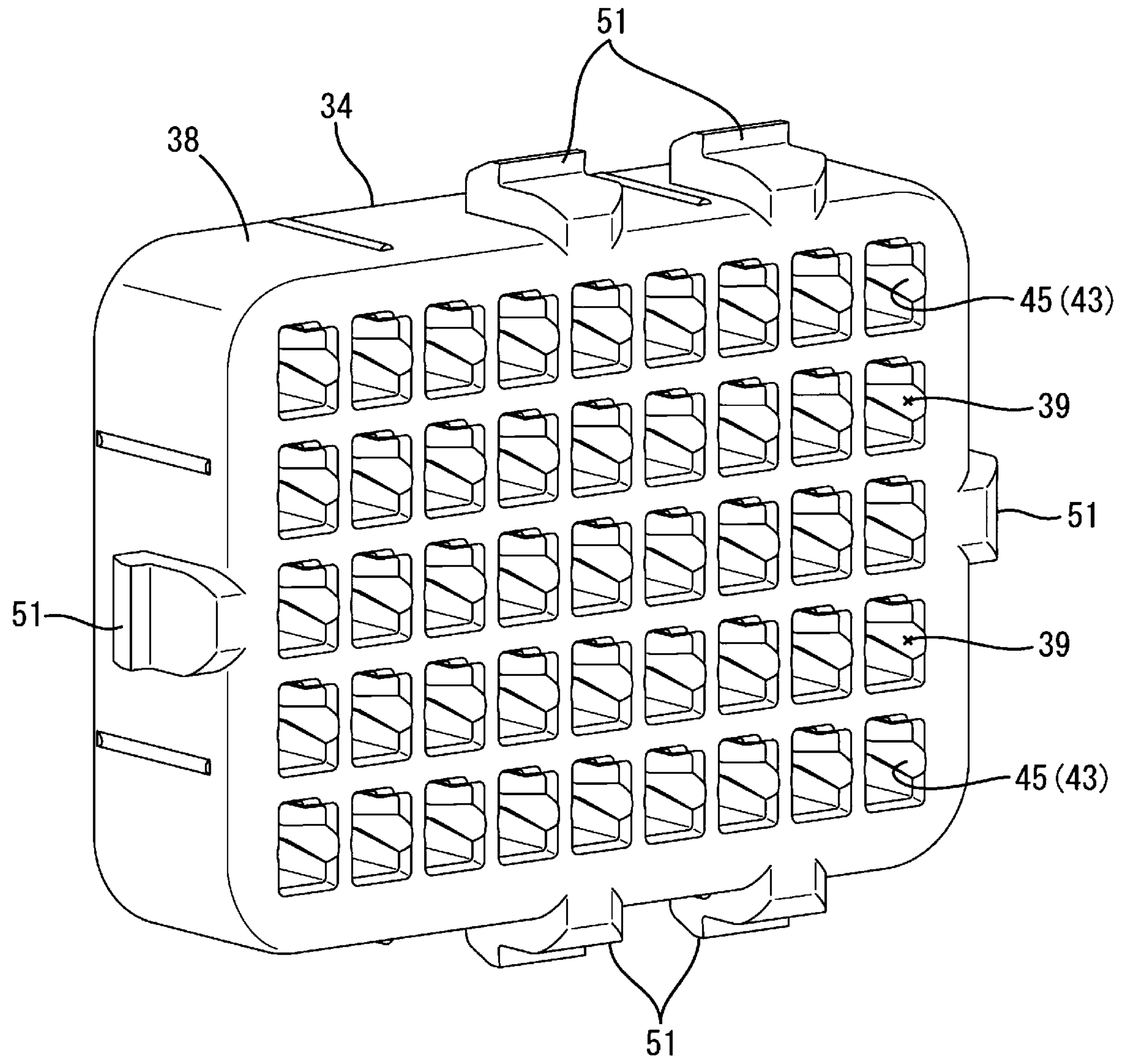
FIG. 2 is a perspective view of a rear holder.

As shown in FIG. 2, the rear holder 34 includes a holder body 38 having a rectangular outer shape with four rounded corners. As shown in FIG. 1, the holder body 38 has a constant thickness in the front-rear direction and is accommodated into the accommodating portion 36. The holder body 38 is formed with a plurality of through holes 39 penetrating in the front-rear direction. The respective through holes 39 communicate with later-described sealing holes 61 of the rubber plug 60 with the rear holder 34 and the rubber plug 60 assembled with the housing body 31. The terminal fitting 70 is inserted and accommodated into the cavity 35 through the through hole 39 and the sealing hole 61. The dummy plug 10 is accommodated from the through hole 39 to the sealing hole 61.

Figure 6:
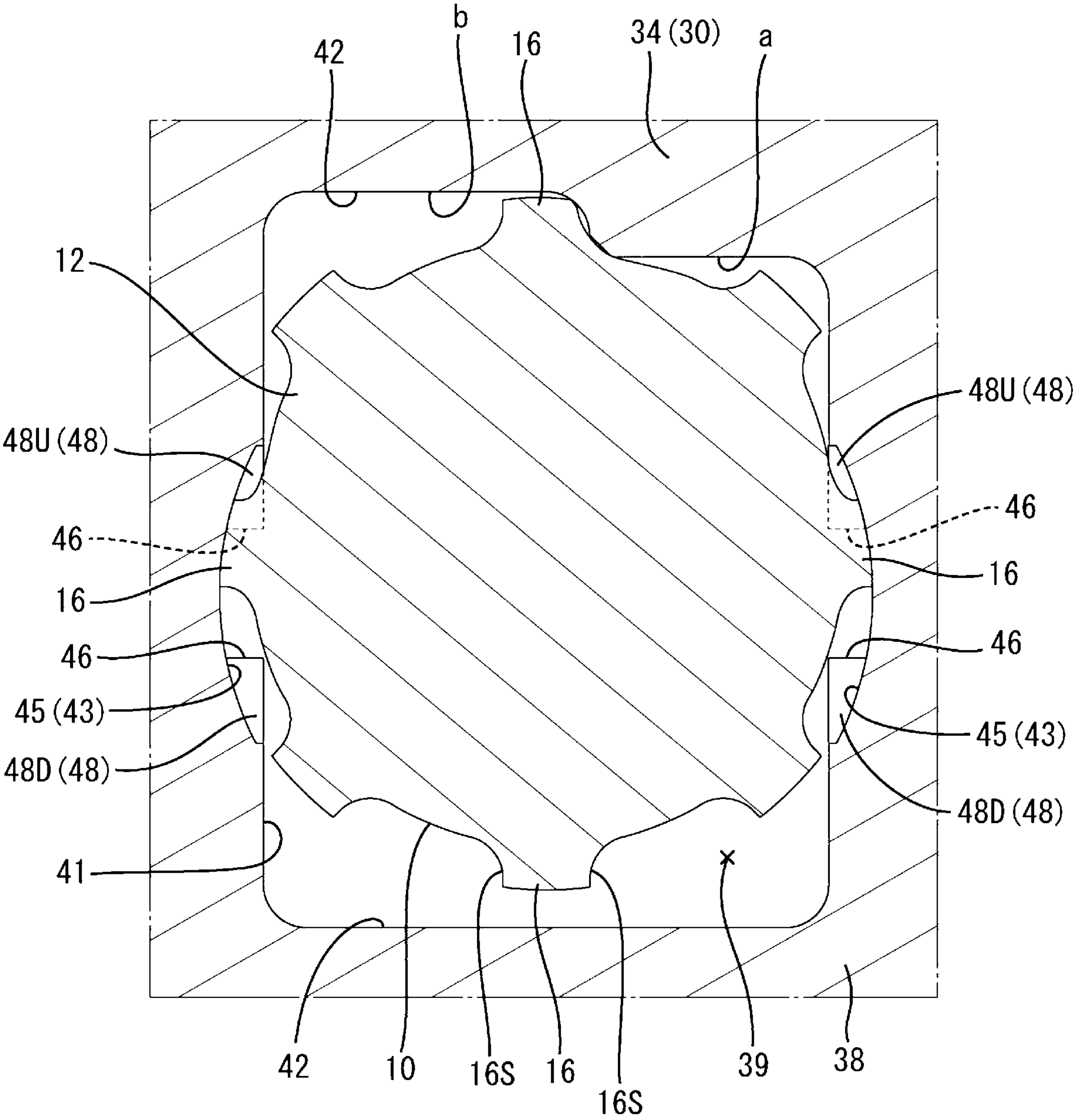
FIG. 6 is an enlarged transverse section showing a state where the dummy plug is assembled while being shifted upward.
Figure 7:
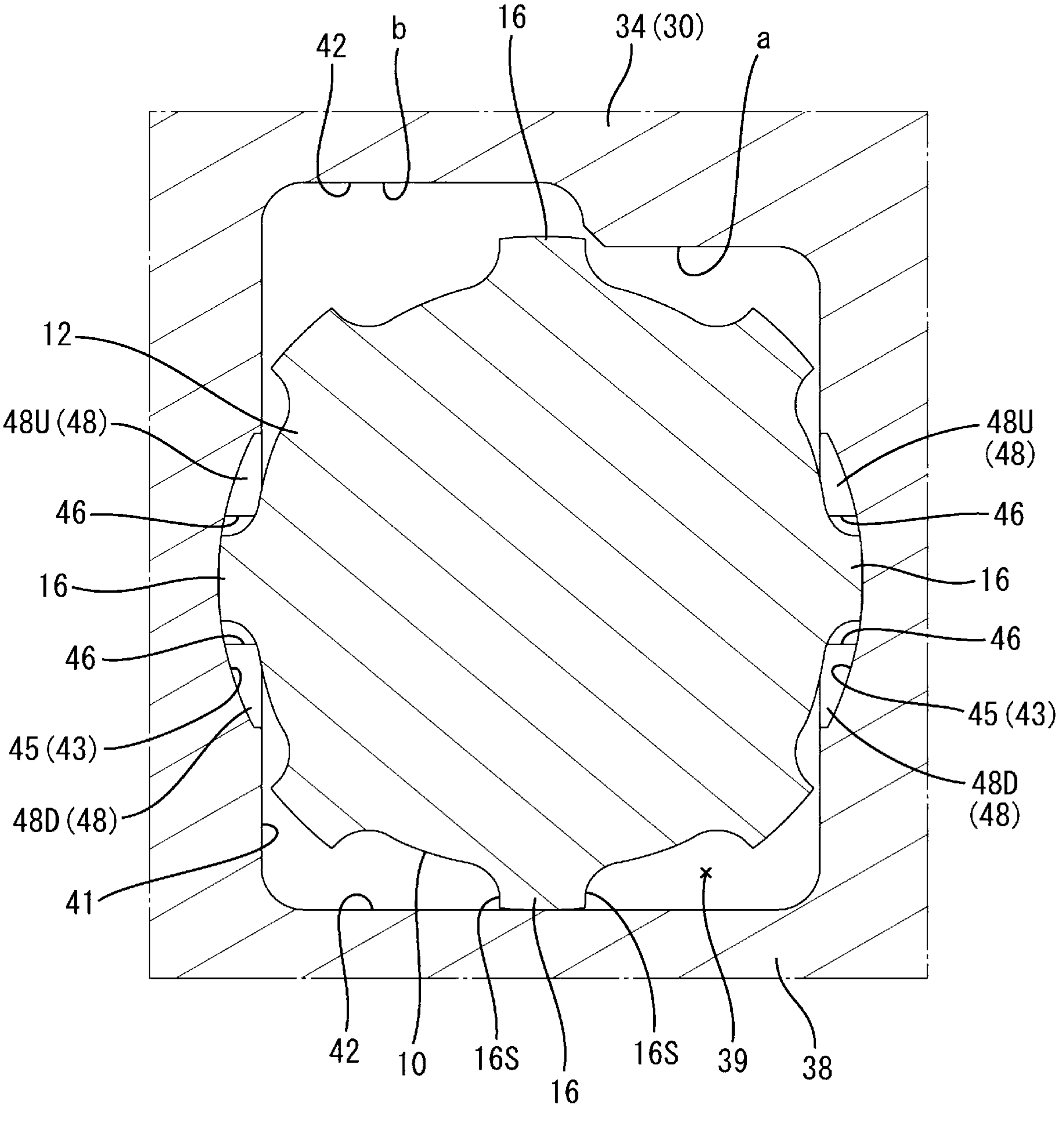
FIG. 7 is an enlarged transverse section showing a state where the dummy plug is assembled at a proper position.

The inner surface of the through hole 39 has a cross-sectional shape corresponding to a later-described box portion 71 of the terminal fitting 70 and includes, as shown in FIGS. 6 and 7, a pair of long side portions 41 facing each other in a lateral direction and a pair of short side portions 42 facing each other in the vertical direction. Each long side portion 41 is constituted by a left or right wall surface arranged along the vertical direction. Each short side portion 42 is constituted by an upper or lower wall surface shorter than the long side portion 41. The upper short side portion 42 is so arranged that the other lateral side (side b in FIGS. 6 and 7) is higher than one lateral side (side a in FIGS. 6 and 7). Recesses 43 are formed to be open in the respective long side portions 41. The respective recesses 43 are arranged to face each other in the lateral direction in vertically intermediate parts of the respective long side portions 41.

Figure 3:
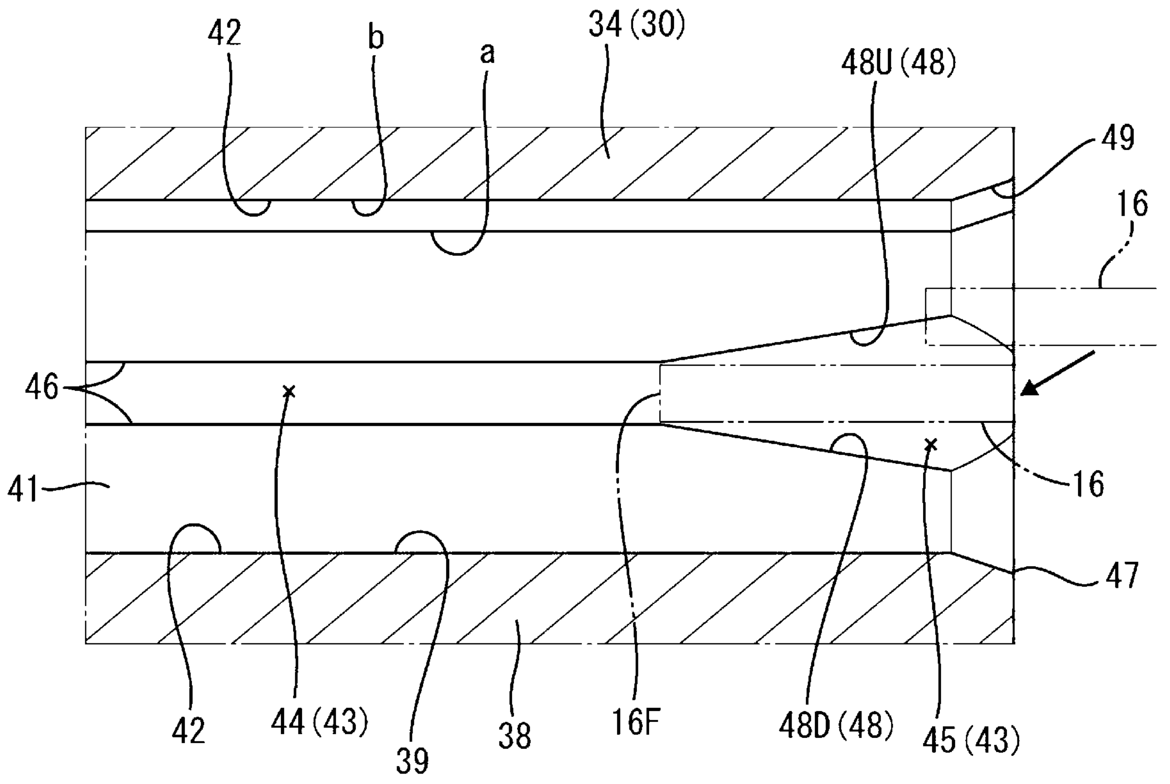
FIG. 3 is an enlarged side view in section of a through hole of the rear holder.

The recess 43 is groove-like and includes, as shown in FIG. 3, a straight groove 44 extending in the front-rear direction and an inclined groove 45 connected behind the straight groove 44. The straight groove 44 is in the form of a rectangular recess in a transverse cross-section and has a pair of straight surfaces 46 facing each other in parallel in the vertical direction. The front end of the straight groove 44 is open in the front surface of the holder body 38.

The inclined groove 45 communicates with the rear end of the straight groove 44 on the long side portion 41 and is arranged to be continuous with the straight groove 44. The rear end of the inclined groove 45 serves as an inlet 47 open in the rear surface of the holder body 38. A later-described protrusion 16 of the dummy plug 10 is inserted into the recess 43 from the inlet 47 and arranged to be press-fit into the recess 43.

The inclined groove 45 has a pair of inclined surfaces 48 inclined to expand in the vertical direction from the respective straight surfaces 46 of the recess 43 toward the inlet 47 on a pair of side surfaces facing each other in the vertical direction. Each inclined surface 48 is composed of an upper inclined surface 48U inclined upward toward a rear side and a lower inclined surface 48D inclined downward toward the rear side. Although not shown in detail, the inclined groove 45 has such a transverse cross-sectional shape that the inclined surfaces 48 are gradually largely curved toward the rear side from the form of the rectangular recess corresponding to the straight groove 44 and, as shown in FIGS. 6 and 7, formed to have an arcuate shape in the rear surface of the holder body 38.

A tapered guiding portion 49 for guiding the terminal fitting 70 is formed in a peripheral edge part of the through hole 39 in the rear surface of the holder body 38. The guiding portion 49 is cut to be open in the rear surface of the holder body 38 on the side of the inlet 47 of the inclined groove 45.

Further, as shown in FIG. 2, the rear holder 34 includes a plurality of holder lock portions 51 projecting on the upper, lower, left and right surfaces of the holder body 38. The respective holder lock portions 51 are locked to unillustrated lock receiving portions formed on the housing body 31 to restrict the rear holder 34 from coming out from the accommodating portion 36.

Rubber Plug

The rubber plug 60 is made of rubber such as silicon rubber and, although not shown in detail, has a rectangular outer shape with four rounded corners. The rubber plug 60 is inserted and accommodated into the accommodating portion 36 prior to the rear holder 34. As shown in FIG. 1, the rubber plug 60 is sandwiched between the rear holder 34 and the housing body 31, whereby the rubber plug 60 is restricted from coming out from the accommodating portion 36. The rubber plug 60 is formed with a plurality of sealing holes 61 penetrating in the front-rear direction. Each sealing hole 61 communicates with the cavity 35 on a front end and communicates with the through hole 39 on a rear end. A plurality of inner peripheral lips 62 are formed side by side in the front-rear direction on the inner surface of each sealing hole 61. Each inner peripheral lip 62 is held in close contact with the outer peripheral surface of a wire 100 connected to the terminal fitting 70 or the outer peripheral surface of a later-described plug body 11 of the dummy plug 10 to seal between the sealing hole 61 and the wire 100 or the dummy plug 10 in a liquid-tight manner. A plurality of outer peripheral lips 63 are formed side by side in the front-rear direction on the outer surface of the rubber plug 60. Each inner peripheral lip 63 is held in close contact with the inner peripheral surface of the accommodating portion 36 of the housing 30 to seal the inside of the housing 30 in a liquid-tight manner.

Terminal Fittings

The terminal fitting 70 is formed, such as by bending an electrically conductive metal plate. As shown in FIG. 1, the terminal fitting 70 includes the box portion 71 in the form of a rectangular tube and a barrel portion 72 in the form of an open barrel connected behind the box portion 71. The barrel portion 72 is electrically and mechanically connected to an end part of the wire 100. The tab of the unillustrated mating terminal is inserted and electrically connected to the box portion 71 at the time of connection of the connector C and the mating connector.

Sealing Ring

The sealing ring 80 is made of rubber and, as shown in FIG. 1, mounted on the outer peripheral surface of the housing body 31. The sealing ring 80 is held in close contact with the outer peripheral surface of the housing body 31 and the inner peripheral surface of a receptacle of the mating connector to seal between the connector C and the mating connector in a connected state in a liquid-tight manner.

Lever

The lever 90 is made of synthetic resin and, although not shown in detail, rotatably mounted on the housing body 31 as shown in FIG. 1. If the lever 90 is rotated with respect to the housing body 31, the connection of the connector C and the mating connector proceeds. When the lever 90 reaches a rotation end position, the connector C and the mating connector are held in the connected state by a lever lock portion 91 formed in the lever 90.

Dummy Plug

Figure 4:
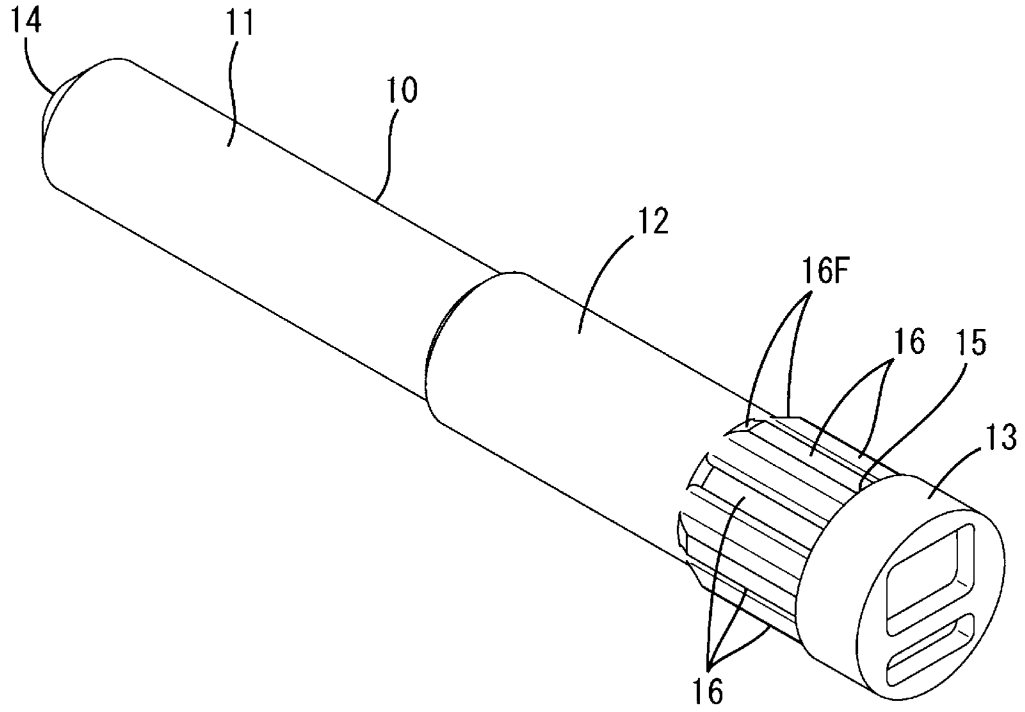
FIG. 4 is a perspective view of a dummy plug.
Figure 5:
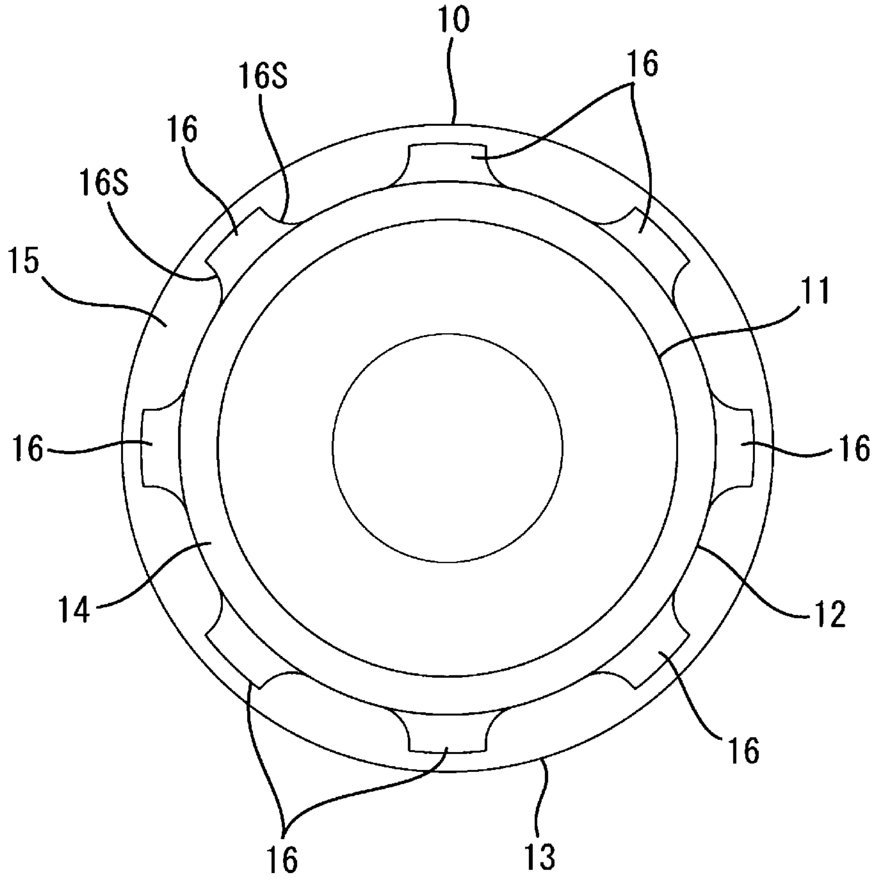
FIG. 5 is a front view of the dummy plug.

The dummy plug 10 is made of synthetic resin and has, as shown in FIG. 4, a cylindrical shape long in the front-rear direction as a whole. Specifically, the dummy plug 10 includes the plug body 11, an extending portion 12 concentrically connected behind the plug body 11, and a push-in portion 13 concentrically connected behind the extending portion 12. As shown in FIG. 5, the extending portion 12 has a first step surface 14 having a larger diameter than the plug body 11 and facing forward while intersecting the outer peripheral surface of the plug body 11. The push-in portion 13 has a second step surface 15 having a larger diameter than the extending portion 12 and facing forward while intersecting the outer peripheral surface of the extending portion 12.

As shown in FIG. 1, the plug body 11 is inserted into the sealing hole 61 communicating with the cavity 35 not accommodating the terminal fitting 70 (hereinafter, referred to as an empty cavity 35A) in a liquid-tight manner, and prevents water intrusion into the empty cavity 35A.

The extending portion 12 has a cylindrical shape extending rearward from the plug body 11 and is inserted into the through hole 39. Further, the dummy plug 10 includes a plurality of the protrusions 16 projecting from the outer peripheral surface of the extending portion 12. As shown in FIG. 4, each protrusion 16 is in the form of a rib extending in the front-rear direction. Further, as shown in FIG. 5, eight protrusions 16 are arranged at fixed intervals in a circumferential direction on the outer peripheral surface of the extending portion 12. As shown in FIGS. 5 and 6, a transverse cross-sectional shape (see FIG. 6) of each protrusion 16 is a trapezoidal shape or a rectangular shape approximating a trapezoidal shape, and side surface parts 16 facing in the circumferential direction are curved and connected to the outer peripheral surface of the extending portion 12.

As shown in FIG. 4, the front ends of the respective protrusions 16 are aligned at the same position in the front-rear direction. The front end of each protrusion 16 is formed into a slope 16F inclined rearward toward a radially outer side. The rear end of each protrusion 16 is integrally coupled to the second step surface 15. A maximum width in the circumferential direction of the protrusion 16 (width of a part connected to the outer peripheral surface of the extending portion 12) is equal to or smaller than a vertical groove width of the straight groove 44 (see FIG. 3).

Functions

In assembling, the rubber plug 60 and the rear holder 34 are successively inserted into the accommodating portion 36 of the housing body 31 and the rear holder 34 is locked to the housing body 31. Subsequently, the terminal fittings 70 are inserted into the cavities 35 and the dummy plug 10 is inserted into the sealing hole 61 and the through hole 39 communicating with the empty cavity 35A.

Here, a worker can perform a mounting operation of the dummy plug 10 without considering an orientation about an axis (directionality) of the dummy plug 10. If the dummy plug 10 is inserted to a proper depth from the through hole

39 to the sealing hole 61, the second step surface 15 of the push-in portion 13 butts against the rear surface of the holder body 38 and an inserting operation of the dummy plug 10 is stopped. If the dummy plug 10 is mounted at a proper position, a center of the plug body 11 and a center of the sealing hole 61 coincide and the sealing hole 61 is properly sealed by the plug body 11.

In an insertion process of the dummy plug 10, the extending portion 12 is restricted from being shifted in position between the pair of long side portions 41 facing each other in the lateral direction, but gaps are formed between the extending portion 12 and the pair of short side portions 42 facing each other in the vertical direction and the extending portion 12 is possibly shifted in position in ranges of the gaps.

However, in the case of this embodiment, arbitrary two protrusions 16 paired in a radial direction, out of the respective protrusions 16 of the dummy plug 10, are respectively arranged to be press-fit into the recesses 43 of the respective long side portions 41, whereby the position shift of the dummy plug 10 is corrected and the dummy plug 10 can reach the proper position.

That is, even if the position of the extending portion 12 should be shifted upward from the proper position in the through hole 39 as shown in FIG. 6, the arbitrary two protrusions 16 enter the respective recesses 43 from the inlet 47 and the slopes 16F of the protrusions 16 can contact the inclined surfaces 48. If the inserting operation of the dummy plug 10 proceeds, the protrusions 16 are automatically displaced toward vertically central sides of the long side portions 41 along the inclined surfaces 48 (see an arrow indicating a displacement of the protrusion 16 in FIG. 3). If the dummy plug 10 is inserted to the proper depth, the slopes 16F are arranged to be able to enter the straight grooves 44 of the recesses 43 as shown in FIG. 3. Further, as shown in FIG. 7, radially outer sides of the protrusions 16 are press-fit and held on the wall surfaces on the vertically central sides of the long side portions 41. In this way, the extending portion 12 is arranged in a center of the through hole 39 and the plug body 11 connected coaxially with the extending portion 12 is also arranged concentrically with the sealing hole 61. As a result, the sealing hole 61 of the rubber plug 60 is sealed by the plug body 11 and predetermined sealability is ensured.

According to this embodiment, since the worker can perform the mounting operation (inserting operation) into the housing 30 without considering the orientation about the axis of the dummy plug 10, workability is excellent. Particularly, since the eight protrusions 16 are equally arranged at intervals in the circumferential direction on the outer peripheral surface of the extending portion 12 in the case of this embodiment, a transition can be quickly made to a state where arbitrary two protrusions 16 can contact the inclined surfaces 48 of the corresponding recesses 43. Further, the dummy plug 10 is stably held at the proper position with respect to the housing 30.

Other Embodiments of Present Disclosure

The embodiment disclosed this time should be considered illustrative in all aspects, rather than restrictive.

In the case of the above embodiment, eight protrusions are formed on the outer peripheral surface of the extending portion. However, only one protrusion may be formed on the outer peripheral surface of the extending portion as another embodiment. However, two or more protrusions are preferably formed on the outer peripheral surface of the extending portion and it is particularly preferable to form four, six or eight (as in the case of the above embodiment) protrusions.

In the case of the above embodiment, two recesses are formed in the inner surface of the through hole. However, one recess may be formed in the inner surface of the through hole as another embodiment.

In the case of the above embodiment, the recess is composed of the straight groove and the inclined groove. However, the recess may be composed of only either one of the straight groove and the inclined groove as another embodiment.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
- a housing formed with a through hole;
- a rubber plug to be arranged inside the housing, the rubber plug being formed with a sealing hole communicating with the through hole; and
- a dummy plug to be arranged from the through hole to the sealing hole, wherein:
- the housing includes a recess open in an inner surface of the through hole, and
- the dummy plug includes:
  - a plug body to be held in close contact with an inner surface of the sealing hole by being arranged in the sealing hole;
  - an extending portion continuously extending from the plug body, the extending portion being arranged in the through hole; and
  - a protrusion projecting from an outer peripheral surface of the extending portion, the protrusion being arranged to be press-fit into the recess.

2. The connector of claim 1, wherein a plurality of the protrusions are arranged at intervals in a circumferential direction on the outer peripheral surface of the extending portion.

3. The connector of claim 2, wherein a pair of the recesses are arranged in the inner surface of the through hole, and the protrusion is arranged to be press-fit into each of the pair of recesses.

4. The connector of claim 1, wherein the recess is in the form of a groove extending from an inlet for introducing the protrusion toward a side communicating with the sealing hole in the inner surface of the through hole and has a pair of inclined surfaces expanded toward the inlet on a pair of facing side surfaces.

5. The connector of claim 4, wherein:
- the inner surface of the through hole includes a pair of short side portions facing each other and a pair of long side portions facing each other while intersecting the pair of short side portions and longer than the short side portions in the housing,
- the recess is open in the long side portion, and
- the pair of inclined surfaces are inclined to approach the short side portions toward the inlet on the long side portion.

* * * * *